(12) United States Patent
McCloud et al.

(10) Patent No.: US 11,607,862 B2
(45) Date of Patent: Mar. 21, 2023

(54) EXTRUDED MOLDS AND METHODS FOR MANUFACTURING COMPOSITE TRUCK PANELS

(71) Applicant: Wabash National, L.P., Lafayette, IN (US)

(72) Inventors: Travis Smith McCloud, Cadiz, KY (US); Scott M. Lewit, Indialantic, FL (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 16/710,832

(22) Filed: Dec. 11, 2019

(65) Prior Publication Data

US 2020/0114617 A1  Apr. 16, 2020

Related U.S. Application Data

(62) Division of application No. 15/299,810, filed on Oct. 21, 2016, now Pat. No. 10,538,051.

(Continued)

(51) Int. Cl.
*B32B 3/30* (2006.01)
*B29C 33/38* (2006.01)
(Continued)

(52) U.S. Cl.
CPC ............ *B32B 3/30* (2013.01); *B29C 33/3842* (2013.01); *B29C 39/003* (2013.01); *B29C 39/026* (2013.01); *B29C 39/10* (2013.01); *B29C 39/38* (2013.01); *B29C 70/48* (2013.01); *B32B 5/022* (2013.01); *B32B 5/18* (2013.01); *B32B 27/12* (2013.01); *B32B 27/36* (2013.01); *B29C 33/04* (2013.01); *B29C 33/40* (2013.01);
(Continued)

(58) Field of Classification Search
CPC .... B21C 23/145; B29C 33/306; B29C 33/307
See application file for complete search history.

(56) References Cited

U.S. PATENT DOCUMENTS 2,274,060 A * 2/1942 Hart .......................... A43D 3/02
                                                    164/520
2,368,327 A   1/1945 Rose
(Continued)

FOREIGN PATENT DOCUMENTS

AU        07132/60 B2   11/1999
CA        1329818 C      5/1994
(Continued)

OTHER PUBLICATIONS

Black, Sara, "Structural adhesives, Part 1: Industrial," CompositesWorld, posted Apr. 11, 2016, 7 pages.
(Continued)

*Primary Examiner* — Galen H Hauth
(74) *Attorney, Agent, or Firm* — Faegre Drinker Biddle & Reath LLP

(57) ABSTRACT

Extruded molds and methods for manufacturing composite structures using the extruded molds are disclosed. The molds may include recessed or raised longitudinal features to impart a corresponding shape to the molded composite structures. The composite structures may be panels used to construct cargo vehicles, for example.

19 Claims, 6 Drawing Sheets

Related U.S. Application Data

(60) Provisional application No. 62/245,503, filed on Oct. 23, 2015.

(51) Int. Cl.

| | |
|---|---|
| *B29C 39/00* | (2006.01) |
| *B29C 39/02* | (2006.01) |
| *B29C 39/10* | (2006.01) |
| *B29C 39/38* | (2006.01) |
| *B29C 70/48* | (2006.01) |
| *B32B 5/02* | (2006.01) |
| *B32B 5/18* | (2006.01) |
| *B32B 27/12* | (2006.01) |
| *B32B 27/36* | (2006.01) |
| *B29C 37/00* | (2006.01) |
| *B29C 33/40* | (2006.01) |
| *B29C 33/04* | (2006.01) |
| *B29C 33/42* | (2006.01) |
| *B29K 67/00* | (2006.01) |
| *B29K 75/00* | (2006.01) |
| *B29K 105/00* | (2006.01) |
| *B29K 105/04* | (2006.01) |
| *B29K 105/08* | (2006.01) |
| *B29K 309/08* | (2006.01) |
| *B29L 7/00* | (2006.01) |
| *B29L 31/30* | (2006.01) |

(52) U.S. Cl.
CPC .......... *B29C 33/42* (2013.01); *B29C 37/0032* (2013.01); *B29C 2037/0035* (2013.01); *B29K 2067/00* (2013.01); *B29K 2075/00* (2013.01); *B29K 2105/0061* (2013.01); *B29K 2105/04* (2013.01); *B29K 2105/0854* (2013.01); *B29K 2309/08* (2013.01); *B29K 2905/02* (2013.01); *B29L 2007/002* (2013.01); *B29L 2031/3002* (2013.01); *B32B 2260/021* (2013.01); *B32B 2260/046* (2013.01); *B32B 2262/101* (2013.01); *B32B 2266/0278* (2013.01)

(56) References Cited

U.S. PATENT DOCUMENTS

| | | |
|---|---|---|
| 3,557,992 A | 1/1971 | Reeves |
| 3,637,252 A | 1/1972 | Metsker |
| 4,331,628 A | 5/1982 | Ziegler |
| 4,418,507 A | 12/1983 | Roberts et al. |
| 4,685,720 A | 8/1987 | Oren et al. |
| 4,758,299 A | 7/1988 | Burke |
| 4,976,490 A | 12/1990 | Gentle |
| 5,403,063 A | 4/1995 | Sjostedt et al. |
| 5,429,066 A | 7/1995 | Lewit et al. |
| 5,468,207 A | 11/1995 | Bower et al. |
| 5,507,405 A | 4/1996 | Thomas et al. |
| 5,562,981 A | 10/1996 | Ehrlich |
| 5,664,518 A | 9/1997 | Lewit et al. |
| 5,700,118 A | 12/1997 | Bennett et al. |
| 5,765,639 A | 6/1998 | Muth |
| 5,772,276 A | 6/1998 | Fetz et al. |
| 5,800,749 A | 9/1998 | Lewit et al. |
| 5,802,984 A | 9/1998 | Thoman et al. |
| 5,830,308 A | 11/1998 | Reichard |
| 5,860,668 A | 1/1999 | Hull et al. |
| 5,860,693 A | 1/1999 | Ehrlich |
| 5,890,435 A | 4/1999 | Thoman et al. |
| 5,897,818 A | 4/1999 | Lewit et al. |
| 5,908,591 A | 6/1999 | Lewit et al. |
| 5,916,093 A | 6/1999 | Fecko et al. |
| 5,979,684 A | 11/1999 | Ohnishi et al. |
| 5,992,117 A | 11/1999 | Schmidt |
| 6,004,492 A | 12/1999 | Lewit et al. |
| 6,013,213 A | 1/2000 | Lewit et al. |
| 6,076,693 A | 6/2000 | Reiter et al. |
| 6,082,810 A | 7/2000 | Benneii |
| 6,092,472 A | 7/2000 | Thoman et al. |
| 6,199,939 B1 | 3/2001 | Ehrlich |
| 6,206,669 B1 | 3/2001 | Lewit et al. |
| 6,220,651 B1 | 4/2001 | Ehrlich |
| 6,227,125 B1 | 5/2001 | Schroeder et al. |
| 6,231,711 B1 | 5/2001 | Roberts et al. |
| 6,247,747 B1 | 6/2001 | Kawanomoto et al. |
| 6,318,794 B1 | 11/2001 | Berube |
| 6,349,988 B1 | 2/2002 | Foster et al. |
| 6,374,546 B1 | 4/2002 | Fecko |
| 6,496,190 B1 | 12/2002 | Driemeyer et al. |
| 6,497,190 B1 | 12/2002 | Lewit |
| 6,505,883 B1 | 1/2003 | Ehrlich |
| 6,543,469 B2 | 4/2003 | Lewit et al. |
| 6,615,741 B2 | 9/2003 | Fecko et al. |
| 6,626,622 B2 | 9/2003 | Zubko |
| 6,688,835 B1 | 2/2004 | Buher |
| 6,723,273 B2 | 4/2004 | Johnson et al. |
| 6,740,381 B2 | 5/2004 | Day et al. |
| 6,745,470 B2 | 6/2004 | Foster et al. |
| 6,755,998 B1 | 6/2004 | Reichard et al. |
| 6,761,840 B2 | 7/2004 | Fecko et al. |
| 6,824,341 B2 | 11/2004 | Ehrlich |
| 6,843,525 B2 | 1/2005 | Preisler |
| 6,854,791 B1 | 2/2005 | Jaggi |
| 6,863,339 B2 | 3/2005 | Boehm et al. |
| 6,869,561 B2 | 3/2005 | Johnson et al. |
| 6,877,940 B2 | 4/2005 | Nelson et al. |
| 6,893,075 B2 | 5/2005 | Fenton et al. |
| 6,911,252 B2 | 6/2005 | Lewit et al. |
| 6,986,546 B2 | 1/2006 | Ehrlich |
| 7,000,978 B1 | 2/2006 | Messano |
| 7,025,166 B2 | 4/2006 | Sean |
| 7,025,408 B2 | 4/2006 | Jones et al. |
| 7,069,702 B2 | 7/2006 | Ehrlich |
| 7,134,820 B2 | 11/2006 | Ehrlich |
| 7,182,396 B2 | 2/2007 | William |
| 7,219,952 B2 | 5/2007 | William |
| 7,264,305 B2 | 9/2007 | Kuriakose |
| 7,353,960 B2 | 4/2008 | Seiter |
| 7,407,216 B2 | 8/2008 | Taylor |
| 7,434,520 B2 | 10/2008 | Zupancich et al. |
| 7,451,995 B2 | 11/2008 | Bloodworth et al. |
| 7,461,888 B2 | 12/2008 | Brown |
| 7,517,005 B2 | 4/2009 | Kuriakose |
| 7,575,264 B1 | 8/2009 | Solomon |
| 7,578,534 B2 | 8/2009 | Wuerfel, III |
| 7,578,541 B2 | 8/2009 | Layfield et al. |
| 7,587,984 B2 | 9/2009 | Zupancich et al. |
| 7,588,286 B2 | 9/2009 | Lewallen et al. |
| 7,594,474 B2 | 9/2009 | Zupancich |
| 7,608,313 B2 | 10/2009 | Solomon et al. |
| 7,621,589 B1 | 11/2009 | Gerome |
| 7,704,026 B2 | 4/2010 | Roush et al. |
| 7,722,112 B2 | 5/2010 | Ehrlich |
| 7,748,172 B2 | 7/2010 | Zupancich et al. |
| 7,762,618 B2 | 7/2010 | Lewallen et al. |
| 7,790,076 B2 | 9/2010 | Seiter et al. |
| 7,829,165 B2 | 11/2010 | Grandominico et al. |
| 7,887,120 B2 | 2/2011 | Boivin et al. |
| 7,901,537 B2 | 3/2011 | Jones et al. |
| 7,905,072 B2 | 3/2011 | Verhaeghe |
| 7,914,034 B2 | 3/2011 | Roush |
| 7,931,328 B2 | 4/2011 | Lewallen et al. |
| 8,016,322 B2 | 9/2011 | Keehan et al. |
| 8,056,960 B2 | 11/2011 | Brown |
| 8,186,747 B2 | 5/2012 | Bloodworth et al. |
| 8,263,217 B2 | 9/2012 | Verhaeghe |
| 8,342,588 B2 | 1/2013 | Skaradzinski |
| 8,448,989 B2 | 5/2013 | Verhaeghe |
| 8,474,871 B1 | 7/2013 | Ludwick |
| 8,696,048 B2 | 4/2014 | Griffin et al. |
| 8,757,704 B2 | 6/2014 | Zhao et al. |
| 8,814,255 B2 | 8/2014 | Yamaji et al. |
| 8,876,193 B2 | 11/2014 | Kunkel et al. |
| 8,950,144 B2 | 2/2015 | Padmanabhan |

(56) References Cited

U.S. PATENT DOCUMENTS

| | | | |
|---|---|---|---|
| 9,051,014 B2 | 6/2015 | Lookebill et al. | |
| 9,138,943 B2 | 9/2015 | Weinberg et al. | |
| 9,138,974 B2 | 9/2015 | Weinberg et al. | |
| 9,138,975 B2 | 9/2015 | Weinberg et al. | |
| 9,174,656 B2 | 11/2015 | Heitmeyer et al. | |
| 9,199,440 B2 | 12/2015 | Weinberg et al. | |
| 9,205,635 B2 | 12/2015 | Weinberg et al. | |
| 9,260,117 B2 | 2/2016 | Vande Sande | |
| 9,317,468 B2 | 4/2016 | Liebald et al. | |
| 9,339,987 B2 | 5/2016 | Weinberg et al. | |
| 9,409,607 B2 | 8/2016 | Osten | |
| 9,434,421 B1 | 9/2016 | Lu et al. | |
| 9,499,203 B1 | 11/2016 | Finley | |
| 9,566,769 B2 | 2/2017 | Weinberg et al. | |
| 9,604,677 B2 | 3/2017 | Mckinney et al. | |
| 9,650,003 B2 | 5/2017 | Owens et al. | |
| 9,708,009 B2 | 7/2017 | Vance | |
| 9,738,050 B2 | 8/2017 | Lee et al. | |
| 9,744,753 B2 | 8/2017 | Sheffield et al. | |
| 9,815,501 B2 | 11/2017 | Mccormack et al. | |
| 9,827,750 B2 | 11/2017 | Lookebill et al. | |
| 9,828,164 B2 | 11/2017 | Denson | |
| 9,878,744 B2 | 1/2018 | Lu et al. | |
| 9,884,660 B2 | 2/2018 | Fenton | |
| 9,884,661 B2 | 2/2018 | Fenton | |
| 9,889,637 B2 | 2/2018 | Weinberg et al. | |
| 2001/0011832 A1 | 8/2001 | Ehrlich et al. | |
| 2004/0094875 A1 | 5/2004 | Estrada et al. | |
| 2004/0258605 A1* | 12/2004 | Joseph | B22C 9/00 423/445 R |
| 2005/0194381 A1 | 9/2005 | Zupancich et al. | |
| 2005/0241253 A1 | 11/2005 | Song et al. | |
| 2006/0065152 A1 | 3/2006 | Heitmeyer et al. | |
| 2006/0108361 A1 | 5/2006 | Seiter | |
| 2006/0121244 A1 | 6/2006 | Godwin et al. | |
| 2006/0123725 A1 | 6/2006 | Godwin | |
| 2006/0158005 A1 | 7/2006 | Brown | |
| 2006/0179733 A1 | 8/2006 | Padmanabhan | |
| 2006/0201081 A1 | 9/2006 | Godwin | |
| 2006/0219129 A1 | 10/2006 | Jarvis | |
| 2007/0102960 A1* | 5/2007 | Booher | B62D 33/023 296/182.1 |
| 2007/0119850 A1 | 5/2007 | Seiter | |
| 2007/0132278 A1 | 6/2007 | Lester et al. | |
| 2007/0160793 A1 | 7/2007 | Cageao et al. | |
| 2007/0194602 A1 | 8/2007 | Ehrlich | |
| 2007/0216197 A1 | 9/2007 | Wuerfel | |
| 2007/0250025 A1 | 10/2007 | Sams et al. | |
| 2008/0290057 A1 | 11/2008 | Zupancich et al. | |
| 2009/0126600 A1 | 5/2009 | Zupancich et al. | |
| 2009/0278386 A1 | 11/2009 | Ehrlich | |
| 2010/0101876 A1 | 4/2010 | Misencik | |
| 2010/0109309 A1 | 5/2010 | Kootstra | |
| 2011/0095574 A1 | 4/2011 | Brown | |
| 2011/0204611 A1 | 8/2011 | Ziegler et al. | |
| 2012/0223212 A1* | 9/2012 | Schneider | E04G 9/06 249/187.1 |
| 2013/0207413 A1 | 8/2013 | Lookebill et al. | |
| 2013/0328243 A1 | 12/2013 | Hino et al. | |
| 2014/0199551 A1 | 7/2014 | Lewit | |
| 2014/0262011 A1 | 9/2014 | Lewit et al. | |
| 2014/0300134 A1 | 10/2014 | Gerst | |
| 2014/0374013 A1* | 12/2014 | Hansen | B29C 33/307 156/243 |
| 2015/0054311 A1 | 2/2015 | Marchesano et al. | |
| 2015/0076861 A1 | 3/2015 | Padmanabhan | |
| 2015/0137560 A1 | 5/2015 | Preisler et al. | |
| 2015/0158532 A1 | 6/2015 | Ayuzawa et al. | |
| 2015/0203160 A1 | 7/2015 | Peterson et al. | |
| 2016/0332393 A1 | 11/2016 | Autry et al. | |
| 2017/0057561 A1 | 3/2017 | Fenton | |
| 2017/0113434 A1 | 4/2017 | Mccloud et al. | |
| 2017/0166263 A1 | 6/2017 | Mckinney et al. | |
| 2017/0210317 A1 | 7/2017 | Owens et al. | |
| 2017/0240216 A1 | 8/2017 | Bauer et al. | |
| 2017/0240217 A1 | 8/2017 | Storz et al. | |
| 2017/0241134 A1 | 8/2017 | Mccloud et al. | |
| 2017/0247063 A1 | 8/2017 | Banerjee et al. | |
| 2017/0282499 A1 | 10/2017 | Larocco | |
| 2017/0334489 A1 | 11/2017 | Shin | |
| 2018/0037151 A1 | 2/2018 | Bauer et al. | |

FOREIGN PATENT DOCUMENTS

| | | |
|---|---|---|
| CA | 2181750 A1 | 1/1997 |
| CA | 2199584 A1 | 9/1997 |
| CA | 2551863 A1 | 3/1998 |
| CA | 2219312 A1 | 4/1998 |
| CA | 2242467 A1 | 7/1999 |
| CA | 2261384 A1 | 8/1999 |
| CA | 2265405 A1 | 1/2000 |
| CA | 2275848 A1 | 12/2000 |
| CA | 2382578 A1 | 3/2001 |
| CA | 2253308 C | 7/2002 |
| CA | 2455957 A1 | 5/2004 |
| CA | 2768878 A1 | 3/2005 |
| CA | 2811134 A1 | 4/2006 |
| CA | 2529762 A1 | 6/2006 |
| CA | 2650992 A1 | 11/2006 |
| CA | 2528558 A1 | 5/2007 |
| CA | 2565510 A1 | 8/2007 |
| CA | 2604282 A1 | 3/2008 |
| CA | 2689745 A1 | 7/2009 |
| CA | 2689746 A1 | 7/2009 |
| CA | 2689747 A1 | 7/2009 |
| CA | 2689748 A1 | 7/2009 |
| CA | 2689749 A1 | 7/2009 |
| CA | 2689751 A1 | 7/2009 |
| CA | 2797778 A1 | 7/2009 |
| CA | 2802907 A1 | 7/2009 |
| CA | 2788047 A1 | 8/2011 |
| CA | 2763094 A1 | 7/2012 |
| CA | 2807710 A1 | 8/2013 |
| CA | 2848174 A1 | 10/2014 |
| CA | 2894059 A1 | 12/2015 |
| CA | 2977131 A1 | 9/2016 |
| CA | 2958805 A1 | 8/2017 |
| CA | 2958838 A1 | 8/2017 |
| CA | 2958839 A1 | 8/2017 |
| DE | 2617169 A1 | 11/1977 |
| EP | 2660119 A1 | 11/2013 |
| JP | 06-293233 A | 10/1994 |

OTHER PUBLICATIONS

CMS North America, Inc., "Transportation: Refrigerated Semi-trailers, Trailers & Vans," available online at http://www.cmsna.com/13_transportation_refrigerated_semi_trailers_trailers_vans.php on or before Jul. 2, 2014, 2 pages.

Composite Marine Control Surface, installed on USS Pioneer (MCM 9), May 1997, 13 pages.

Composite Twisted Rudder, TCC Meeting 2008, handout, 32 pages.

Eric Green Associates.com, "Composite Rudders Take Shape for U.S. Navy" available online at http://www.ericgreeneassociates.com/Images/Composite_Twisted_Rudder.pdf, accessed as early as Jul. 13, 2014, 7 pages.

Expedition Portal, "Truck Camper Construction Costs?," available online at http://www.expeditionportal.com/forum/threads/12486-Truck-Camper-Construction-Costs at least as early as Jun. 18, 2015, 5 pages.

Griffiths, Bob, "Rudder Gets New Twist with Composites," CompositesWorld, posted Aug. 1, 2006, 4 pages.

International Trucking Shows, "True Composites Platform Highlight of International Trucking Show," Aug. 1992, 1 page.

Johnson Truck Bodies, Blizzard Series brochure, accessed as early as Aug. 1, 2014, 8 pages.

Kedward, Keith and Whitney, James, Delaware Composites Design Encyclopedia, "Design Studies," vol. 5, 1990, preview version available at https://books.google.com/books?id=9-KYOm81MWEC&printsec=frontcover#v=onepage&q&f=false, 17 pages.

(56) References Cited

OTHER PUBLICATIONS

Lightweight Structures B.V., "ColdFeather: lightweight composite isothermal trailer," available online at http://www.lightweight-structures.com/coldfeather-lightweight-composite-isothermal-trailer/index.html at least as early as Jun. 18, 2015, 6 pages.
Morey, Bruce, "Advanced Technologies Supplement: Processes Reduce Composite Costs," Advanced Manufacturing, posted Apr. 1, 2007, 7 pages.
NetCompositesNow.com, "Twisted Composites Rudders," available online at http://www.netcomposites.com/news/twisted-composites-rudders/3202 as early as Aug. 11, 2005, 3 pages.
North American Composites, Virtual Engineered Composites (VEC) Article, available online at http://www.nacomposites.com/delivering-performance/page.asp?issueid=7&page=cover, Fall 2006, 4 pages.
Reichard, Dr. Ronnal P., "Composites in Theme Parks: From the perspective of a contractor-trouble shooter-enthusiast!" presented at Florida Institute of Technology at least as early as 1999, 37 pages.
Scott Bader Group Companies, Crystic, "Composites Handbook", 100 pages.
Seaver, Mark and Trickey, Stephen, "Underwater Blast Loading of a Composite Twisted Rudder with FBGS," dated Apr. 14, 2008, 19th International Conference on Optical Fibre Sensors, 2 pages.
Trailer/Body Builders, "More Emphasis on Less Weight," available at http://trailer-bodybuilders.com/trailers/more-emphasis-less-weight, May 1, 2008, 5 pages.
Zweben, Carl, Handbook of Materials Selection, "Chapter 12: Composite Materials," 2002, preview version available at https://books.google.com/books?id=gWg-rchM700C&printsec=frontcover#v=onepage&q&f=false, 47 pages.

\* cited by examiner

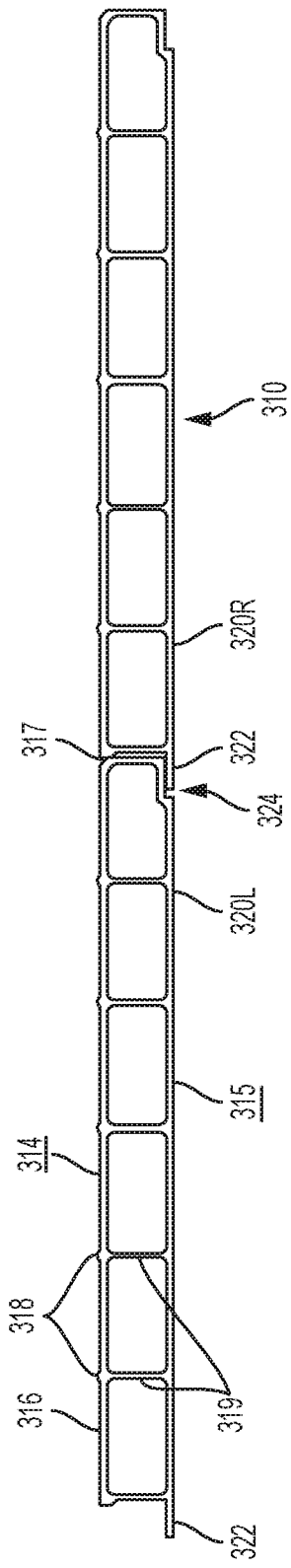
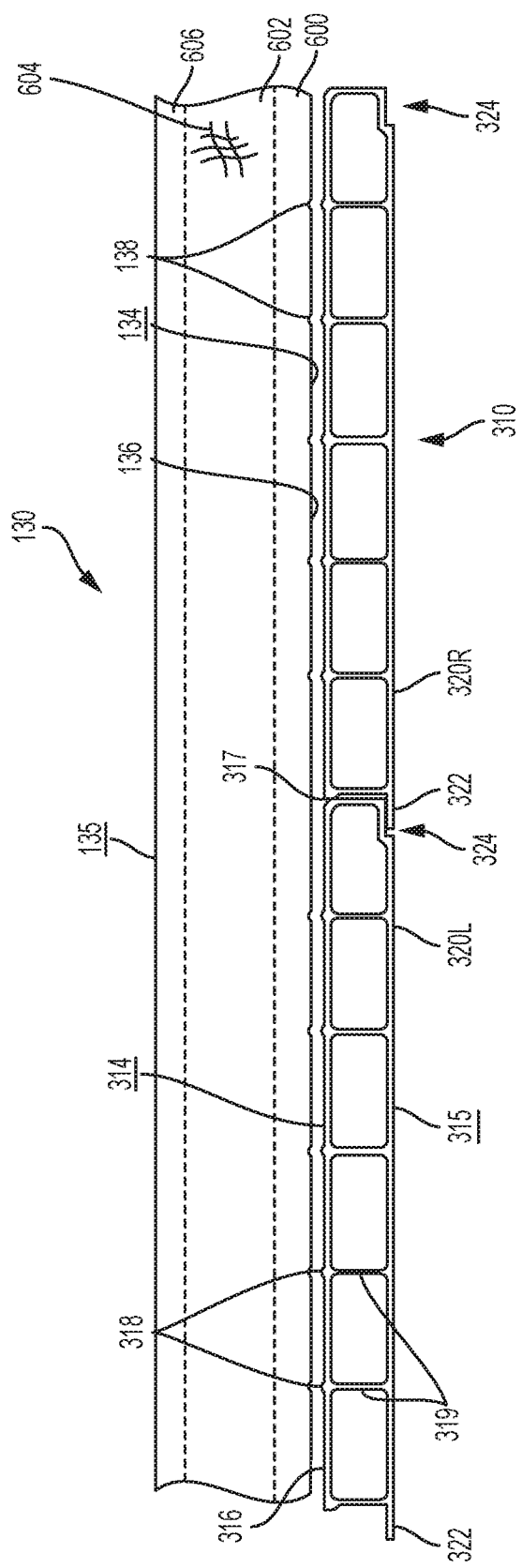

EXTRUDED MOLDS AND METHODS FOR MANUFACTURING COMPOSITE TRUCK PANELS

CROSS REFERENCE TO RELATED APPLICATIONS

This application is a continuation of U.S. patent application Ser. No. 15/299,810, filed Oct. 21, 2016, which claims priority to U.S. Provisional Patent Application Ser. No. 62/245,503, filed Oct. 23, 2015, the disclosures of which are hereby expressly incorporated by reference herein in their entirety.

FIELD OF THE DISCLOSURE

The present disclosure relates generally to molds and methods for manufacturing composite structures using the molds. More particularly, the present disclosure relates to extruded molds and methods for manufacturing composite truck panels using the extruded molds.

BACKGROUND OF THE DISCLOSURE

Molds are used to manufacture composite truck panels. The molds themselves may be constructed of fiberglass, but these fiberglass molds are generally fragile and susceptible to wear and damage. Alternatively, the molds may be constructed of metal, but these metal molds are typically machined and expensive to manufacture.

SUMMARY OF THE DISCLOSURE

Extruded molds and methods for manufacturing composite structures using the extruded molds are disclosed. The molds may include recessed or raised longitudinal features to impart a corresponding shape to the molded composite structures. The composite structures may be panels used to construct cargo vehicles, for example.

According to an exemplary embodiment of the present disclosure, a mold is provided to form a composite structure, the mold including an extruded mold body having a mold surface upon which the composite structure is formed.

According to another exemplary embodiment of the present disclosure, a composite panel formed upon a mold body is provided, the composite panel including a first end, a second end, and a molded surface. The molded surface includes a first portion that is flat, a second portion that is flat, and a third portion that deviates from being flat, wherein the third portion extends entirely from the first end to the second end.

According to yet another exemplary embodiment of the present disclosure, a method of manufacturing a composite structure is provided, the method including providing an extruded mold body having a mold surface, and forming the composite structure upon the mold surface.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 5 is front end elevational view of two adjacent segments from the mold body of FIG. 4;

FIG. 6 is another front end elevational view of the segments of FIG. 5, shown with the floor being molded upon the segments.

Figure 1:
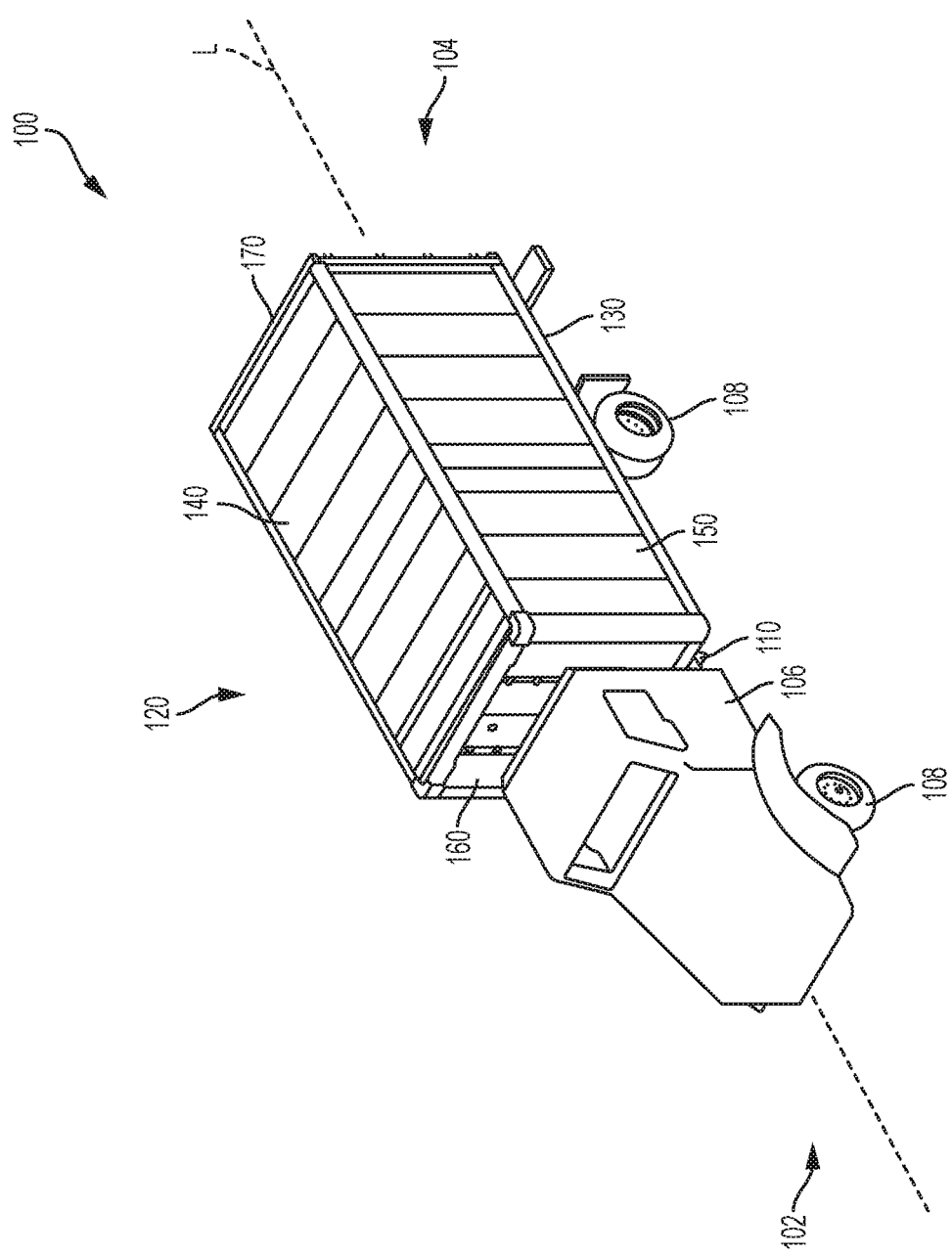
FIG. 1 is a perspective view of an exemplary cargo vehicle of the present disclosure, the cargo vehicle including a cargo body formed from a floor, a roof, right and left sidewalls, a nose, and a rear door assembly.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Cargo Vehicle

Referring initially to FIG. 1, a cargo vehicle 100 is shown for supporting and transporting cargo. The illustrative vehicle 100 extends along a longitudinal axis L from a front end 102 to a rear end 104 and includes a motorized truck 106 that powers a plurality of wheels 108 or other traction devices. The illustrative vehicle 100 also includes a chassis 110 and a cargo body 120 formed from a plurality of panels, specifically a floor 130, a roof 140, right and left sidewalls 150, and a front wall or nose 160. The cargo body 120 also includes a rear door assembly 170 to provide access to the cargo body 120.

In the illustrated embodiment of FIG. 1, cargo body 120 is an enclosed body that is supported entirely atop chassis 110. Cargo body 120 may be refrigerated and/or insulated to transport temperature-sensitive cargo. While the concepts of this disclosure are described in relation to a refrigerated truck body, it will be understood that they are equally applicable to other vehicles generally, and more specifically to conventional trailers (e.g., dry freight semi trailers, refrigerated semi trailers), conventional truck and/or box or van type trailers (e.g., dry vans), examples of which include, but are not limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

2. Composite Panels

Various panels of the cargo body 120 may be constructed, at least in part, of composite materials. For example, the floor 130, roof 140, right and left sidewalls 150, and/or nose 160 of the cargo body 120 may be constructed of composite materials. As such, the floor 130, roof 140, right and left sidewalls 150, and/or nose 160 of the cargo body 120, may be referred to herein as composite panels.

Composite structures are generally formed by combining two or more different constituents that remain separate and distinct in the final composite material. Exemplary composite materials include fiber-reinforced plastics (FRP), for example carbon-fiber reinforced plastics (CRP). These composite structures may lack internal metal components. Also, each composite panel may be a single, unitary component, which may be formed from a plurality of layers permanently coupled together, as discussed further below.

The composite construction of the cargo body 120 may present certain advantages. For example, the composite cargo body 120 may be lighter in weight than a typical metallic cargo body, which may improve fuel efficiency. Also, the composite cargo body 120 may have fewer metallic structures than a typical cargo body, which may make the cargo body 120 less susceptible to corrosion and heat loss. Additionally, the composite cargo body 120 may include fewer parts than a typical metallic cargo body, which may simplify construction, reduce inventory, and reduce variation in manufacturing. Further, the composite cargo body 120 may be suitable for use with sensitive cargo, including foodstuffs, because the composite materials may be inert to avoid reacting with the cargo and other materials and because the composite materials may be easy to clean and maintain to ensure proper hygiene. As a result, the composite cargo body 120 may qualify as "food grade" equipment.

Figure 2:
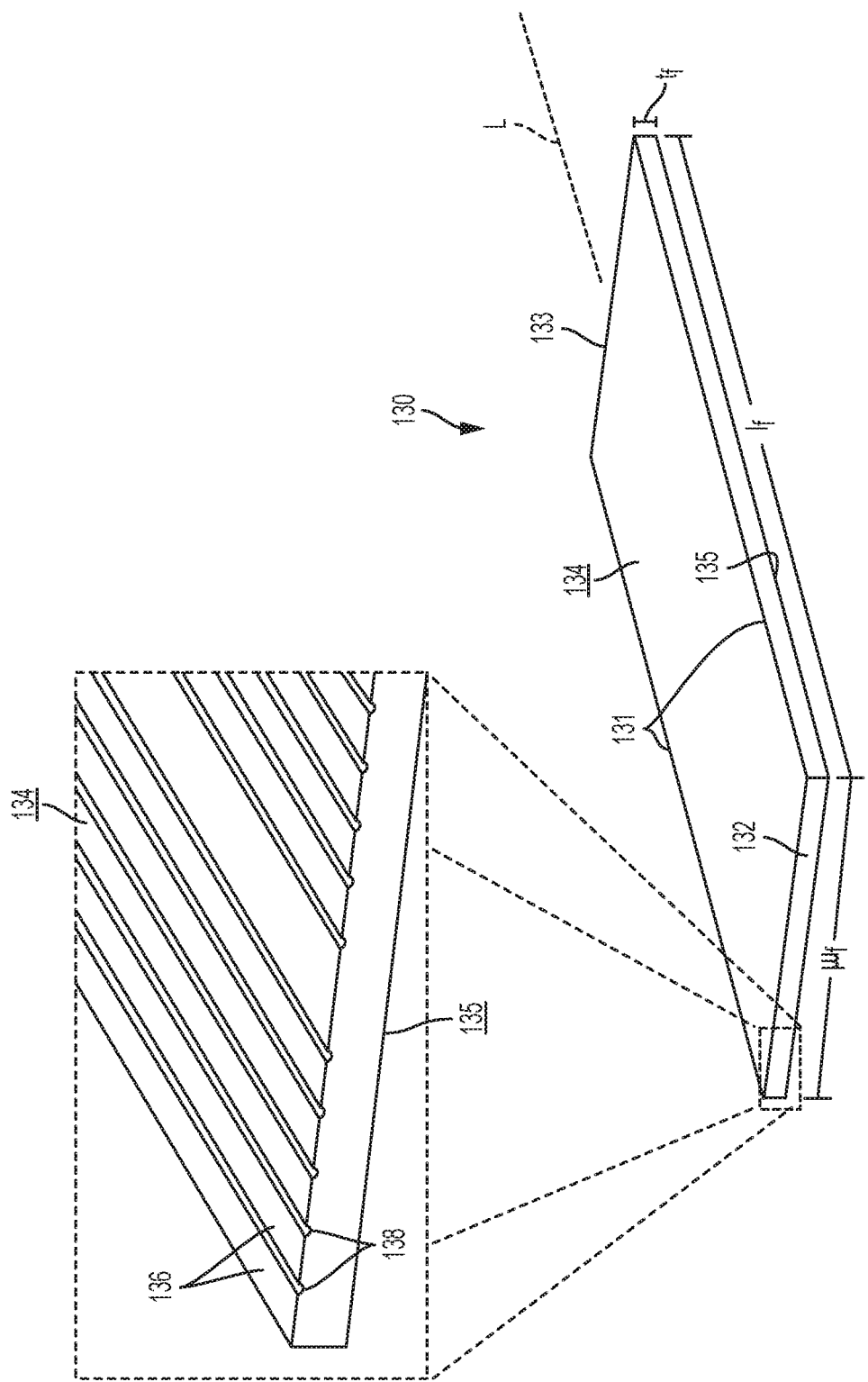
FIG. 2 is a perspective view of the floor of FIG. 1.

Referring next to FIG. 2, the composite floor 130 of the cargo body 120 is shown in more detail. Although the following description pertains to the composite floor 130 of the cargo body 120, this description is also applicable to other composite panels of the cargo body 120, including the roof 130, right and left sidewalls 150, and/or nose 160. This description is also applicable to composite structures generally, including panels and other structures used to construct storage units, temporary shelters, shipping containers, boat hulls, airplane fuselages and wings, and furniture, for example.

The illustrative composite floor 130 is generally rectangular in shape and extends along the longitudinal axis L. of the vehicle 100 (FIG. 1). The composite floor 130 includes right and left sides 131 positioned adjacent to the right and left sidewalls 150 of the cargo body 120, a front end 132 positioned adjacent to the nose 160 of the cargo body 120, and a rear end 133 positioned adjacent to the rear door assembly 170 of the cargo body 120 (FIG. 1).

The composite floor 130 also includes an upper floor surface 134 and a lower floor surface 135. The upper floor surface 134 includes flat portions 136 for supporting cargo. The upper floor surface 134 may also include various longitudinal features that deviate from the flat portions 136 and extend parallel to the longitudinal axis L. For example, as shown in FIG. 2, the upper floor surface 134 includes a plurality of longitudinal channels 138 that are recessed into the otherwise flat upper floor surface 134, with flat portions 136 being located between adjacent channels 138. The upper floor surface 134 may also include longitudinal ridges (not shown) that are raised above the otherwise flat upper floor surface 134. The longitudinal channels 138 and ridges (not shown) may provide traction on the otherwise flat upper floor surface 134 to stabilize the cargo and reduce slippage. The longitudinal channels 138, in particular, may also accommodate electrical wiring, air lines, or other equipment for vehicle 100.

The size and shape of the composite floor 130 may vary to accommodate different vehicles 100. In the illustrated embodiment of FIG. 2, the composite floor 130 has a width $w_f$ between the right and left sides 131 of about 8.5 feet, a length $l_f$ between the front end 132 and the rear end 133 of about 34 feet, and a thickness $t_f$ between the upper floor surface 134 and the lower floor surface 135 of about 4 inches. However, the composite floor 130 may have a width $w_f$ of about 8-12 feet, a length $l_f$ of about 12-60 feet, and a thickness $t_f$ of about 1-8 inches, for example.

Additional information regarding composite structures is disclosed in the following patents and published patent applications, each of which is incorporated by reference in its entirety herein: U.S. Pat. Nos. 5,429,066, 5,800,749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, and 6,543,469, and U.S. Patent Application Publication Nos. 2014/0262011 and 2014/0199551. Exemplary composite structures include DuraPlate® structures provided by Wabash National Corporation of Lafayette, Ind. and PRISMA® structures provided by Compsys, Inc. of Melbourne, Fla.

3. Mold

Referring next to FIGS. 3-6, a mold assembly 300 is provided for manufacturing the composite floor 130 of the cargo body 120 (FIG. 1). In the case of vehicle 100, similar molds may be provided for manufacturing other composite panels of the cargo body 120, such as the roof 140, right and left sidewalls 150, and/or nose 160 (FIG. 1). In the case of other composite structures, such as the above-mentioned storage units, temporary shelters, shipping containers, boat hulls, airplane fuselages and wings, and furniture, similar molds may also be provided for manufacturing those composite structures.

The illustrative mold assembly 300 includes a mold body 310, a base 330, and a frame 340 having castor wheels 342 to facilitate movement of the mold assembly 300. The mold assembly 300 may also include brackets (not shown) to facilitate lifting and transporting the mold assembly 300, such as using a crane.

Figure 4:
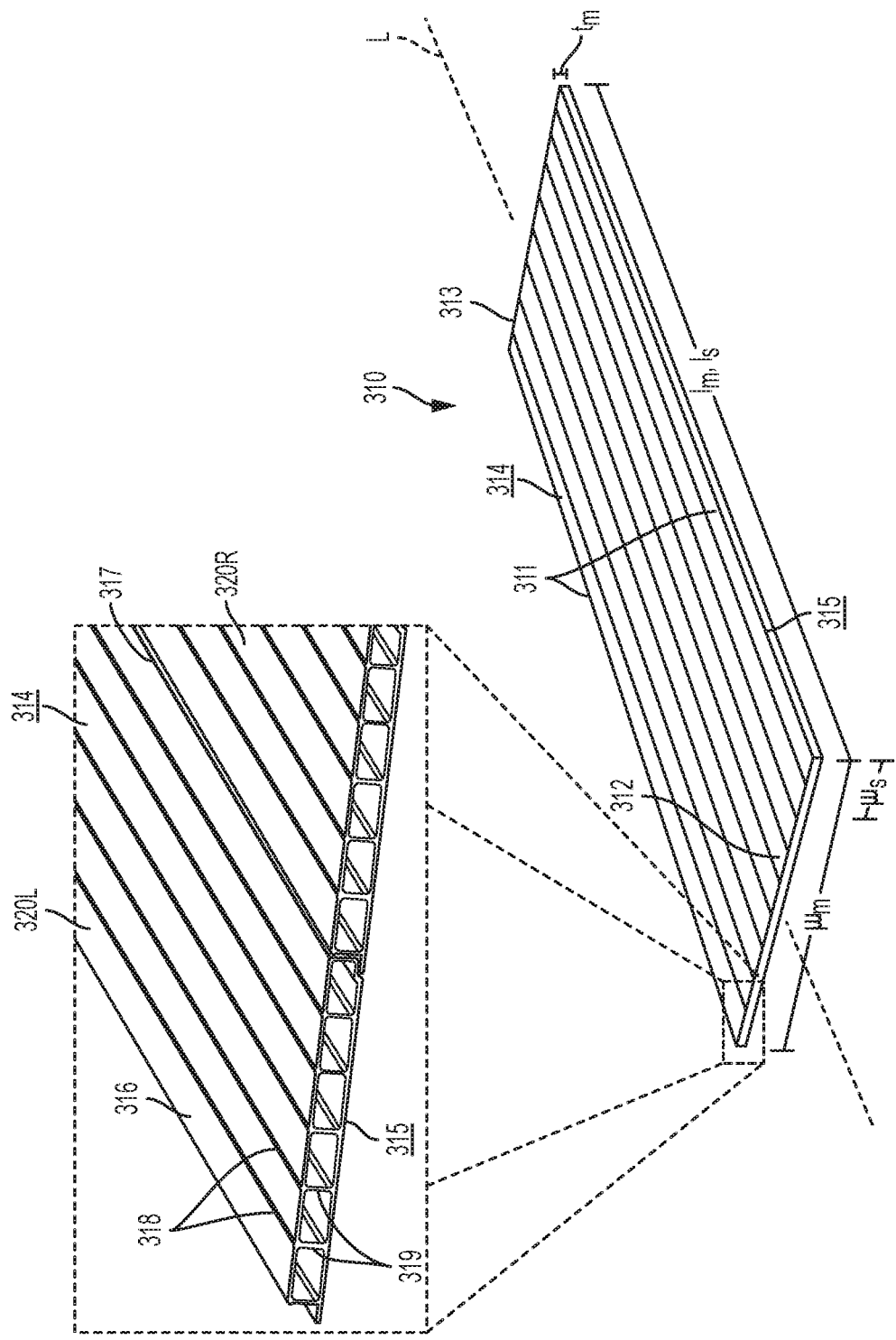
FIG. 4 is a perspective view of the mold body of FIG. 3, the mold body including a plurality of segments.

As shown by comparing FIG. 4 with FIG. 2, the mold body 310 of FIG. 4 generally corresponds in size and shape to the resulting composite floor 130 of FIG. 2. The mold body 310 is generally rectangular in shape and extends along the longitudinal axis L. The mold body 310 includes right and left sides 311 that correspond to the right and left sides 131 of the resulting composite floor 130, a front end 312 that corresponds to the front end 132 of the resulting composite floor 130, and a rear end 313 that corresponds to the rear end 133 of the resulting composite floor 130. The mold body 310 has a width $w_m$ between the right and left sides 311 that is equal to or greater than the width $w_f$ of the resulting composite floor 130. The mold body 310 has a length $l_m$ between the front end 312 and the rear end 313 that is equal to or greater than the length $l_f$ of the resulting composite floor 130.

The mold body 310 also includes an upper mold surface 314 and a lower mold surface 315. The upper mold surface 314 is a negative mold for the resulting upper floor surface 134, such that the upper floor surface 134 can be formed upon the upper mold surface 314, as discussed further below. The upper mold surface 314 includes flat portions 316. Any unintended gaps or defects in the upper mold surface 314 may be filled with a suitable filler 317 (e.g., metal rods, wax) to provide this flat surface. The upper mold surface 314 may also include various longitudinal features that deviate from the flat portions 316 and extend parallel to the longitudinal axis L to form the opposite longitudinal features in the upper floor surface 134. For example, as shown by comparing FIG. 4 with FIG. 2, the upper mold surface 314 includes longitudinal ridges 318 that form corresponding longitudinal channels 138 in the otherwise flat upper floor surface 134. The upper mold surface 314 may also include longitudinal channels (not shown) that would form corresponding longitudinal ridges (not shown) in the otherwise flat upper floor surface 134.

Between the upper mold surface 314 and the lower mold surface 315, the mold body 310 may be substantially hollow except for a plurality of spaced-apart internal supports 319. The hollow construction of the mold body 310 may accommodate a heat exchange fluid (e.g., air, water) inside the mold body 310 to control the temperature of the upper mold surface 314 during molding, as discussed further below.

According to an exemplary embodiment of the present disclosure, the mold body 310 is formed by extrusion along the longitudinal axis L from the front end 312 to the rear end 313. More specifically, the mold body 310 may be formed by passing material through a die along the longitudinal axis L, where the die has a desired cross-section in a direction perpendicular to the longitudinal axis L. As such, the mold body 310 may be referred to herein as an "extruded" mold body 310. Because the features in the upper mold surface 314 of the mold body 310 (e.g., the flat portions 316, the ridges 318) are also formed by extrusion, these features may extend along the longitudinal axis L entirely from the front end 312 to the rear end 313. The mold body 310 may be constructed of metal (e.g., aluminum) or another material that is suitable for extrusion.

To accommodate standard extrusion equipment, the mold body 310 may be divided into a plurality of individually extruded segments 320 across the width $w_m$. The illustrative mold body 310 includes nine segments 320, with each segment 320 accounting for ⅑ of the width $w_m$ but this number may vary. The width $w_s$ of each segment 320 may be about 0.5-2 feet, and the length $l_s$ of each segment may be the same as the overall length $l_m$ of the mold body 310 itself. For simplicity of construction, the segments 320 may be identical to one another and trimmed to the desired length.

Figure 3:
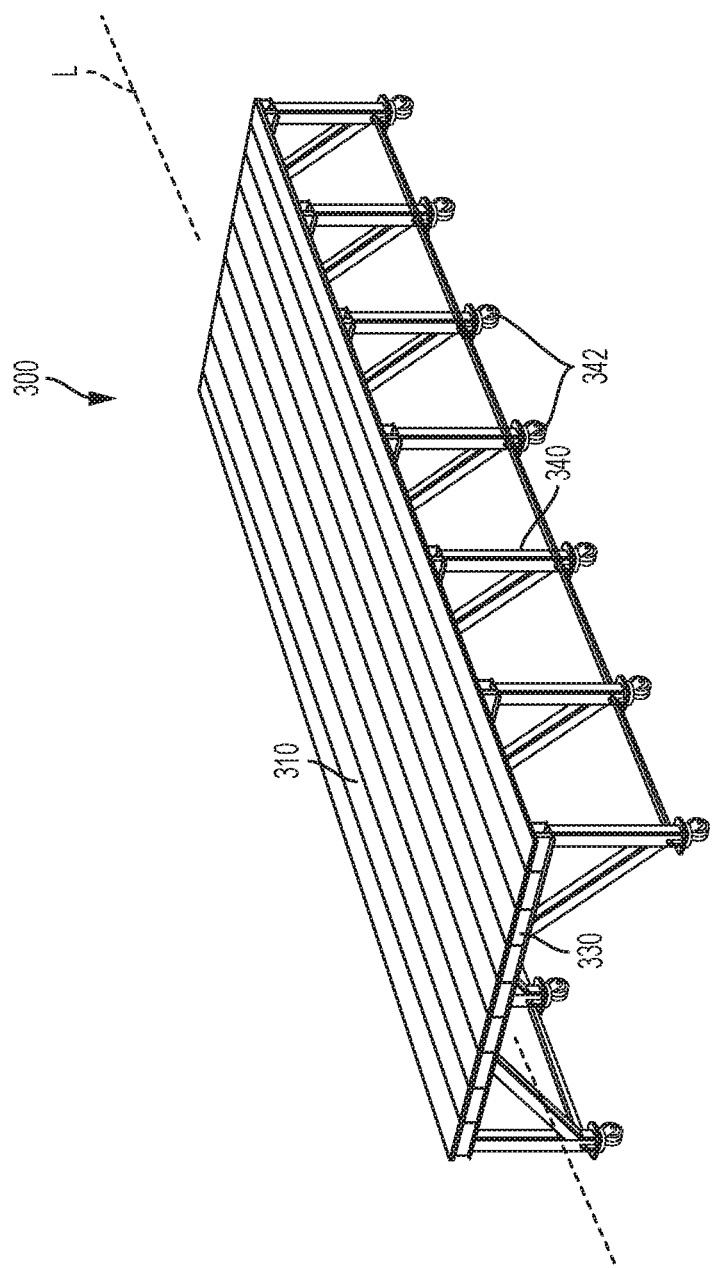
FIG. 3 is a perspective view of an exemplary mold assembly of the present disclosure, the mold assembly including a mold body, a base, and a frame.

FIG. 5 shows two adjacent segments of mold body 310—a left segment 320L and a right segment 320R. The segments 320L, 320R are placed side by side and coupled together to form the mold body 310. Adjacent segments 320L, 320R may be coupled directly together through mechanical fastening, welding, and/or adhesive bonding, for example. Also, adjacent segments 320L, 320R may include interconnecting features. For example, in the illustrated embodiment of FIG. 5, the left side of each segment 320L, 320R includes a protrusion 322, and the right side of each segment 320L, 320R includes a recess 324 that is configured to receive the adjacent protrusion 322. In certain embodiments, this connection may be tight and secure, like a snap connection, such that the interconnecting features are configured to physically hold the adjacent segments 320L, 320R together. Adjacent segments 320L, 320R may also be indirectly coupled together through the base 330 (FIG. 3). For example, if the base 330 is constructed of plywood, each segment 320L, 320R may be screwed to the base 330. The filler 317 may be used between adjacent segments 320L, 320R to provide a flat upper mold surface 314.

The extruded construction of the mold body 310 may present certain advantages. First, the extruded mold body 310 may be less expensive than a machined mold body. Second, the extruded mold body 310 may be more durable than a cast (e.g., fiberglass) mold body. Third, the extruded mold body 310 may be repaired, if necessary, such as by removing and replacing a damaged segment 320 while retaining the other segments 320. Finally, the profile of the upper mold surface 314 may be customized to create desired features in the upper floor surface 130 (FIG. 2).

4. Molding Process

Figure 7:
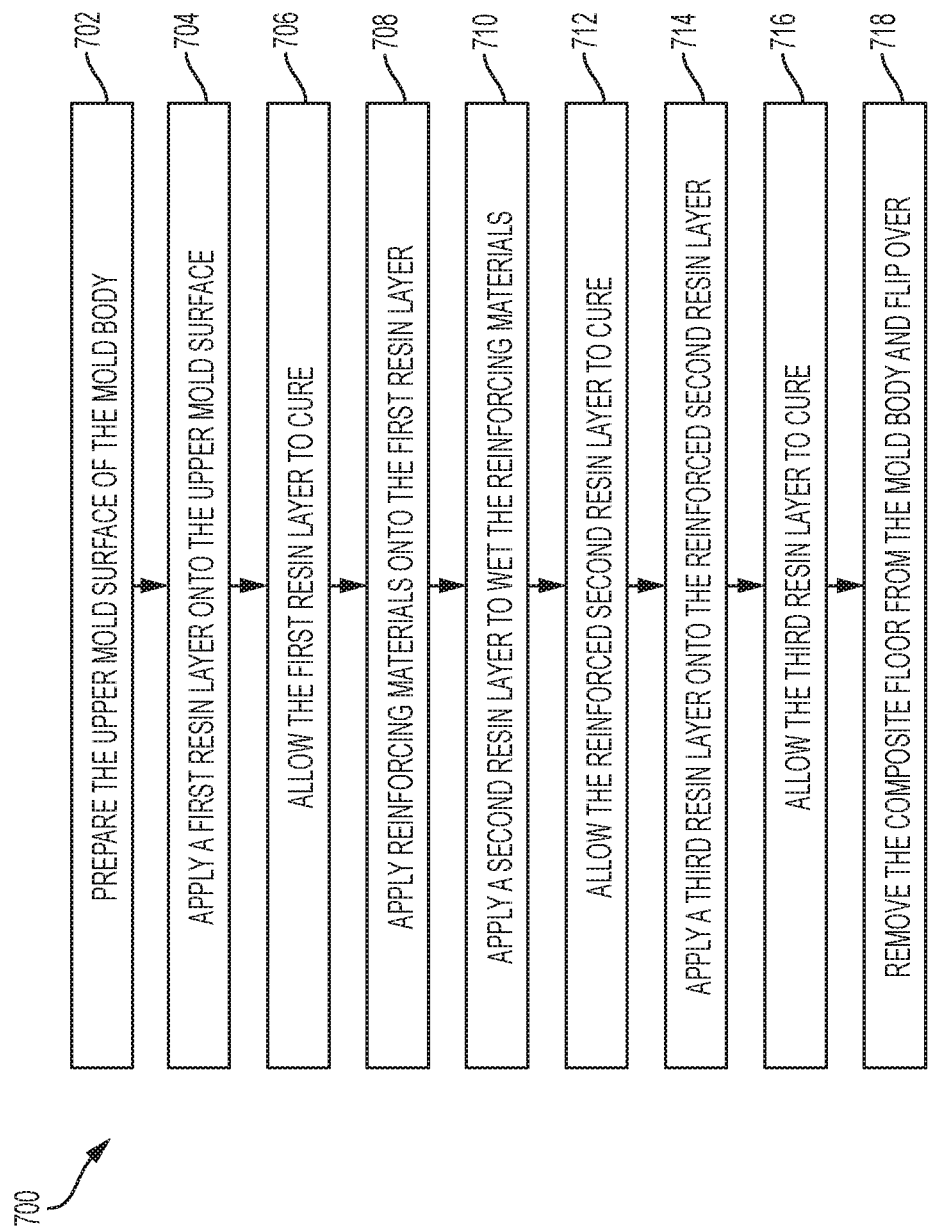
FIG. 7 is a flow chart of an exemplary molding process of the present disclosure.

Referring next to FIGS. 6 and 7, an exemplary molding process 700 is provided for manufacturing the composite floor 130 using the mold assembly 300.

In step 702, the upper mold surface 314 of the mold body 310 may be prepared for molding. For example, the upper mold surface 314 may be cleaned and/or pretreated with a release agent (e.g., wax) to facilitate separation after molding.

In step 704, a first resin layer 600 is applied onto the upper mold surface 314 of the mold body 310. An exemplary first resin is a gel coat polyester resin. The first resin layer 600 may be applied across the mold body 310 in liquid form by spraying, rolling, brushing, or calendaring, for example. The first resin layer coats the negative space above the upper mold surface 314.

In step 706, the first resin layer 600 is allowed to cure using a suitable curing catalyst. Ultimately, the first resin layer 600 will take on the opposite profile of the upper mold surface 314 to form the upper floor surface 134 of the composite floor 130.

In step 708, one or more reinforcing materials 604 are applied onto the cured first resin layer 600 from step 706. Exemplary reinforcing materials 604 include woven or stitched fiberglass cloth sheets, for example. Other exemplary reinforcing materials 604 include extruded preform assemblies of a woven or stitched fiberglass cloth, a nonwoven spun bond polymeric (e.g., polyester) material, and a polymeric (e.g., polyurethane) foam core, for example. The spun bond polymeric material may be mechanically stitched to the fiberglass cloth and/or the foam. In one embodiment, the spun bond material may be a polyester material, the foam may be a polyurethane material, and the resin may be a thermoset plastic resin matrix. Such preforms and any other reinforcing materials 604 may be shaped, cut to size, and arranged on the mold assembly 300 in a manner that accommodates the strength requirements of the final structure. In areas of the final structure requiring less strength, the preforms may be relatively large in size, with the foam cores spanning relatively large distances before reaching the surrounding fiberglass and polymeric skins. By contrast, in areas of the final structure requiring more strength, the preforms may be relatively small in size, with the foam cores spanning relatively small distances before reaching the surrounding fiberglass and polymeric skins. For example, the preforms may be shaped as relatively wide panels in areas of the final structure requiring less strength and as relatively narrow support beams in areas of the final structure requiring more strength. Other exemplary techniques for strengthening such support beams include reinforcing the outer skins, such as by using uni-directional glass fibers or additional cloth in the outer skins, and/or reinforcing the inner cores, such as by using hard plastic blocks or higher density foam in the inner cores.

In step 710, a second liquid resin layer 602 is applied and worked into the reinforcing materials 604 to wet the reinforcing materials 604 with the second resin 602. An exemplary second resin is a polyester resin, which may be similar to the first resin. An exemplary resin is the co-cure resin disclosed in U.S. Pat. No. 9,371,468, which is incorporated by reference in its entirety herein.

In step 712, the reinforced second resin layer 602 is allowed to cure using a suitable curing catalyst. During curing, the reinforcing materials 604 may be forced into close contact with the second liquid resin layer 602 by applying pressure on top of the reinforcing materials 604 and/or by applying a vacuum to the reinforcing materials 604, for example. Once cured, the second resin layer 602 becomes permanently coupled to the reinforcing materials 604 and the first resin layer 600 to form a single structure. Steps 708-712 may be repeated one or more times. In certain embodiments, the first curing step 706 may be performed together with the second curing step 712. In other words, the curing steps 706, 712 may be performed simultaneously.

In step 714, a third resin layer 606 may be applied onto the cured second resin layer 602. An exemplary third resin is a polyester resin, which may be similar to the first and/or second resins.

In step 716, the third resin layer 606 is allowed to cure using a suitable curing catalyst. Once cured, the third resin layer becomes permanently coupled to the first resin layer 600 and second resin layer 602 to form a single structure. Ultimately, the third resin layer 606 may form the lower floor surface 135 of the composite floor 130. It is also within the scope of the present disclosure for the third resin layer 606 to be eliminated and for the reinforced second resin layer 602 to form the lower floor surface 135 of the composite floor 130. In certain embodiments, the first curing step 706 and the second curing step 712 may be performed together with the third curing step 716. In other words, the curing steps 706, 712, 716 may be performed simultaneously.

In step 718, the composite floor 130 is removed from the mold body 310 and flipped over 180 degrees such that the upper floor surface 134 that was facing downward toward the mold body 310 now faces upward. If necessary, the outer perimeter of the composite floor 130 may be trimmed to desired dimensions for use in vehicle 100 (FIG. 1).

As indicated above, a heat exchange fluid (e.g., air, water) may be introduced (e.g., pumped) into the hollow mold body 310 to control the temperature of the upper mold surface 314 during the molding process 700. For example, to slow down or otherwise control a curing step 706, 712, 716, a cold heat exchange fluid may be introduced into the hollow mold body 310. Using a cold heat exchange fluid may be particularly beneficial when the curing step 706, 712, 716, is exothermic, because the cold heat exchange fluid may remove excess heat and maintain a controlled curing temperature. To speed up or otherwise control a curing step 706, 712, 716, a hot heat exchange fluid may be introduced into the hollow mold body 310. The temperature of the mold body 310 may also be controlled by placing the mold body 310 inside a temperature-controlled environment, such as a large refrigerator, oven, or autoclave, for example. The heat exchange fluid may be circulated repeatedly through the mold body 310 as part of a heat exchange loop.

Although the illustrative mold assembly 300 of FIG. 6 is an open mold that forms the upper floor surface 134 of the composite floor 130, it is also within the scope of the present disclosure for the mold assembly 300 to form other surfaces of the composite floor 130. For example, the mold assembly 300 may be a closed mold that forms the right and left sides 131, the front end 132, the rear end 133, the upper floor surface 134, and/or the lower floor surface 135 of the composite floor 130. The mold assembly 300 may include one or more mold bodies 310, some or all of which may be extruded. For example, the mold assembly 300 may have upper and lower mold bodies that interact to form the composite floor 130 therebetween. One or both of the upper and lower mold bodies may be extruded.

The closed-molding method may be similar to the open-molding method of FIG. 7 with certain differences, as noted herein. The reinforcing materials may be placed inside the mold assembly 300 before the resin. With the mold assembly 300 closed, the resin may be introduced into the mold assembly 300, such as by injecting the resin into the mold assembly 300 and/or pulling the resin into the mold assembly 300 using a vacuum. Then, the mold assembly 300 may be compressed, such as by using vacuum pressure, mechanical pressure, and/or water pressure, to form the composite floor 130 inside. Finally, the mold assembly 300 may be opened to reveal the composite floor 130.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A mold used to form a composite structure, the mold comprising:
   a raised frame;
   a base supported by the raised frame;
   an extruded mold body received within the base, the extruded mold body comprising a plurality of independent mold body segments coupled together, the plurality of mold body segments defining a mold surface facing away from the base upon which the composite structure is directly formed, the plurality of mold body segments including:
      a first extruded mold body segment having an upper surface, a lower surface opposite the upper surface, and at least one internal support extending between the upper surface and the lower surface; and
      a second extruded mold body segment having an upper surface, a lower surface opposite the upper surface, and at least one internal support extending between the upper surface and the lower surface,
   wherein the upper surface of the first extruded mold body segment and the upper surface of the second extruded mold body segment cooperate to define the mold surface, and each of the first and second extruded mold body segments includes a hollow portion configured to receive a heat exchange fluid.

2. The mold of claim 1, wherein the mold body has a width of about 8-12 feet and a length of about 20-50 feet.

3. The mold of claim 1, wherein each of the mold body segments extends an entire length of the mold body and a partial width of the mold body.

4. The mold of claim 1, wherein each of the mold body segments has a width of about 0.5-2 feet.

5. The mold of claim 1, wherein the plurality of mold body segments are identical to each other.

6. The mold of claim 1, wherein the mold body is constructed of aluminum.

7. The mold of claim 1, wherein the mold surface includes:
 a first portion that is flat;
 a second portion that is flat; and
 a third portion that deviates from being flat, wherein the third portion extends parallel to a longitudinal axis of the extruded mold body.

8. The mold of claim 7, wherein the third portion is a channel that is recessed between the first and second portions.

9. The mold of claim 7, wherein the third portion extends entirely from a first end to a second end of the mold body.

10. The mold of claim 1, wherein:
 the upper surface and the lower surface of the first extruded mold body segment are parallel; and
 the upper surface and the lower surface of the second extruded mold body segment are parallel.

11. The mold of claim 1, wherein the upper surface of the first extruded mold body segment and the upper surface of the second extruded mold body segment are co-planar.

12. The mold of claim 1, wherein the mold is an open mold.

13. The mold of claim 1, wherein the mold is a single-sided mold.

14. The mold of claim 1, further comprising a plurality of brackets to facilitate lifting and transporting the mold.

15. The mold of claim 1,
 wherein the mold surface defines a plurality of longitudinal ridges configured to form corresponding longitudinal channels in the formed composite structure.

16. The mold of claim 15, wherein the extruded mold body extends from a front end to a rear end, and the plurality of longitudinal ridges extend entirely from the front end to the rear end.

17. A mold used to form a composite structure, the mold comprising:
 a raised frame;
 a base supported by the raised frame;
 an extruded mold body received within the base, the extruded mold body comprising a plurality of independent mold body segments coupled together, the plurality of mold body segments defining a mold surface facing away from the base upon which the composite structure is directly formed, the plurality of mold body segments including:
  a first extruded mold body segment having an upper surface, a lower surface opposite the upper surface, and at least one internal support extending between the upper surface and the lower surface; and
  a second extruded mold body segment having an upper surface, a lower surface opposite the upper surface, and at least one internal support extending between the upper surface and the lower surface,
 wherein the upper surface of the first extruded mold body segment and the upper surface of the second extruded mold body segment cooperate to define the mold surface, and each of the first and second extruded mold body segments include a plurality of internal supports extending between the upper surface and the lower surface of the respective one of the first and second extruded mold body segments.

18. The mold of claim 17, wherein the first extruded mold body segment includes at least one internal passageway defined by adjacent ones of the plurality of internal supports, the at least one internal passageway configured to receive a heat exchange fluid.

19. A mold used to form a composite structure, the mold comprising:
 a raised frame;
 a base supported by the raised frame;
 an extruded mold body received within the base, the extruded mold body comprising a plurality of independent mold body segments coupled together, the plurality of mold body segments defining a mold surface facing away from the base upon which the composite structure is directly formed, the plurality of mold body segments including:
  a first extruded mold body segment having an upper surface, a lower surface opposite the upper surface, and at least one internal support extending between the upper surface and the lower surface; and
  a second extruded mold body segment having an upper surface, a lower surface opposite the upper surface, and at least one internal support extending between the upper surface and the lower surface,
 wherein the upper surface of the first extruded mold body segment and the upper surface of the second extruded mold body segment cooperate to define the mold surface, and the raised frame comprises a plurality of castor wheels to facilitate movement of the mold.

\* \* \* \* \*